S. P. LOOMIS.
Domestic Boiler.
No. 86,428.
Patented Feb. 2, 1869.
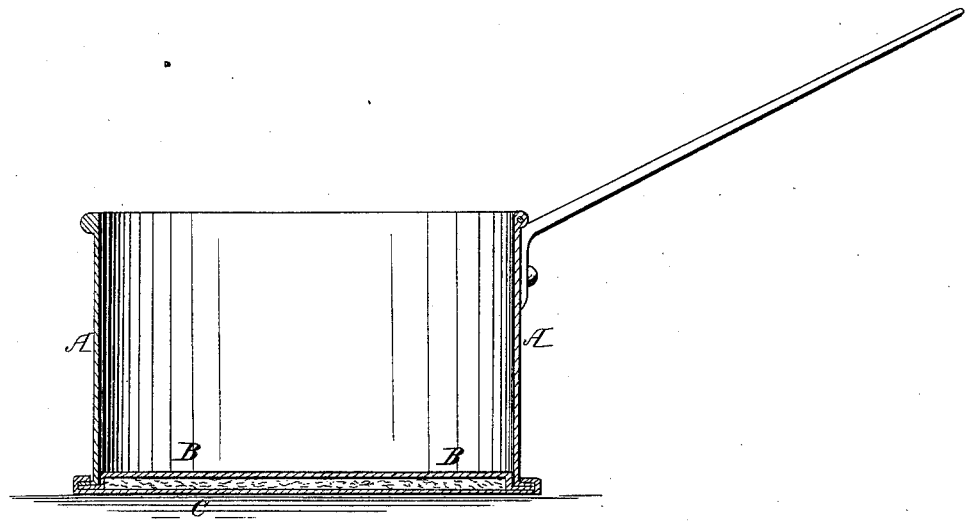
Witnesses.
C. Raettig.
Wm. A. Morgan.
Inventor.
S. P. Loomis.
per Munn & Co.
Attorneys.

S. P. LOOMIS, OF PHILADELPHIA, PENNSYLVANIA.

Letters Patent No. 86,428, dated February 2, 1869.

CULINARY BOILER.

The Schedule referred to in these Letters Patent and making part of the same.

*To all whom it may concern:*

Be it known that I, S. P. LOOMIS, of Philadelphia, in the county of Philadelphia, and State of Pennsylvania, have invented a new and useful Improvement in Sheet-Metal Cooking-Utensils; and I do hereby declare that the following is a full, clear, and exact description thereof, which will enable others skilled in the art to make and use the same, reference being had to the accompanying drawings, forming part of this specification.

The figure is a vertical section of a saucepan, illustrating my improvement.

My invention has for its object to improve the construction of saucepans, bake-pans, and other sheet-metal cooking-utensils, in such a way that the vessels so constructed may wholly prevent the scorching or burning of the substance being boiled, stewed, baked, or otherwise cooked; and It consists in forming the bottom of the utensil with a double bottom, the space between said bottoms being filled with powdered chalk, magnesia, plaster of Paris, or equivalent material, as hereinafter more fully described.

A represents the body of the vessel, the sides of which may be vertical or inclined, and which may be circular or rectangular in its cross-section, the form being wholly immaterial. The lower edges of the sides of the body A are turned out at right angles to the vertical axis of said utensil, as shown in the drawing.

B is the inner bottom of the vessel, the middle part of which is struck up into the form of an inverted dish, so as to fit into the lower part of the body A of the vessel, while its edges extend out beneath the projecting edges of the body A, as shown in the drawing.

C is the outer bottom of the vessel, the edges of which are turned up around and over the edges of the inner bottom B and body A, forming a single seam, as shown in the drawing.

The seam is soldered upon the inner side of the body A, or upon both inner and outer sides of said body, as may be desired.

The space between the inner bottom, B, and the outer bottom, C, is filled with powdered chalk, magnesia, plaster of Paris, or equivalent substance that cannot be heated to a red heat, without being exposed to a higher temperature than it can be exposed to while the utensil is being used for cooking-purposes.

With vessels thus constructed, as has been found by actual experiment, substances the most delicate and the most liable to be scorched, may be heated, boiled, baked, or otherwise cooked, without the remotest chance of their being burned during the operation.

Having thus described my invention,

I claim as new, and desire to secure by Letters Patent—

Forming the bottoms of sheet-metal cooking-utensils double, and with the space between said bottoms filled with powdered chalk, magnesia, plaster of Paris, or equivalent substance, substantially as herein shown and described, and for the purpose set forth.

The above specification of my invention signed by me, this 23d day of October, 1868.

S. P. LOOMIS.

Witnesses:
   E. GREENE COLLINS,
   JAMES T. GRAHAM.